S. J. Cone,
Lathe Chuck,
N°. 48,521. Patented July 4, 1865.
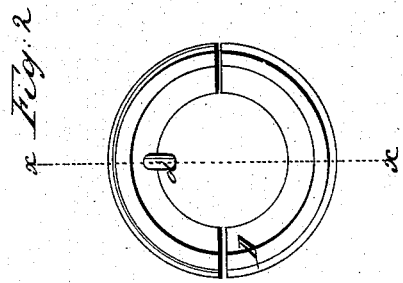
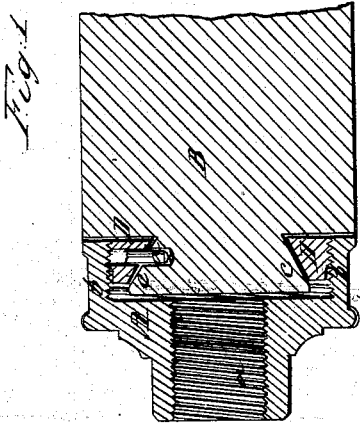
Witnesses
Wm Trewin
Theo Lusch
Inventor
S. J. Cone
per Munn & Co
Attorney

UNITED STATES PATENT OFFICE.

S. J. CONE, OF MIDDLETOWN, CONNECTICUT.

IMPROVED CHUCK FOR LATHES.

Specification forming part of Letters Patent No. 48,521, dated July 4, 1865.

*To all whom it may concern:*

Be it known that I, S. J. CONE, of Middletown, in the county of Middlesex and State of Connecticut, have invented a new and Improved Chuck for Lathes; and I do hereby declare that the following is a full, clear, and exact description thereof, which will enable others skilled in the art to make and use the same, reference being had to the accompanying drawings, forming part of this specification, in which—

Figure 1 is a longitudinal central section of this invention, the line $x\ x$, Fig. 2, indicating the plane of section. Fig. 2 is a rear elevation of the V-shaped split ring which forms the principal point of this invention.

Similar letters of reference indicate like parts.

This invention relates to an improvement in the manner of securing wooden chucks to turning-lathes.

Wooden chucks are used for turning small articles of any desirable description, and they are generally secured to the lathe by providing their inner ends with a screw-thread, which screws into a metal head that is secured to the lathe-spindle. Said metal head is common to a large number of chucks, and by taking the chucks out and replacing them repeatedly the thread on the wood gives and the chuck runs out of truth. Furthermore, much time is lost in cutting the threads on the wooden chucks and fitting them to the metal head.

To avoid these difficulties is the object of this invention, which consists in the employment or use of a split metal ring, V-shaped on its inner edge to fit into a corresponding recess at the inner ends of the wooden chucks, and provided with a screw-thread on its outer circumference to screw into the metal head, calculated to hold the chucks in such a manner that in order to attach a chuck to the metal head nothing is required but to furnish its inner end with a recess corresponding in size and shape to the V-shaped split ring. A stud projecting from the inner circumference of one-half of the split ring and catching in a corresponding hole in the wood prevents the ring from slipping while the chuck is screwed on the metal head.

A represents the metal head, which is provided in one end with an internal screw-thread, $a$, to fit to the thread on the end of the lathe-spindle, and in its opposite end with an internal screw-thread, $b$, to receive the chucks.

The chuck B, instead of being furnished with a thread to fit to the thread $b$ in the head, is turned down at its inner end, so as to form a recess, $c$, corresponding in shape to the V-shaped split ring D. The inner edge of this ring is V-shaped, as clearly shown in the drawings, and its outer circumference is provided with a screw-thread to fit to the screw-thread $c$ in the head.

A stud, $d$, projects from the inner circumference of one-half of the split ring into a socket bored into the wooden chuck, as clearly shown in Fig. 1 of the drawings, and if the ring is adjusted in the recess $c$ of the chuck said stud prevents it from turning or slipping independent of the wood. After the ring has been thus adjusted on the inner end of the chuck said chuck can be screwed into the head without difficulty. The thread on the split ring, which is made of metal, is not liable to give, and the chucks can be taken out of and put into the head without danger that they will run out of truth. Furthermore, in fitting a chuck to the head nothing is required but to turn down its end to form the recess $c$. No screw-thread need be cut, and the time generally spent in fitting the screw-thread to the head is saved.

I claim as new and desire to secure by Letters Patent—

The use of the V-shaped split ring D, applied, in combination with the head A and chuck B, in the manner and for the purpose substantially as set forth.

S. J. CONE.

Witnesses:
EDWD. PAYNE,
HENRY BULLARD.